US008281696B2

(12) United States Patent
McAdoo

(10) Patent No.: US 8,281,696 B2
(45) Date of Patent: Oct. 9, 2012

(54) LINEAR FEED CUTTING APPARATUS AND METHOD

(75) Inventor: David L. McAdoo, Alvarado, TX (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 12/871,790

(22) Filed: Aug. 30, 2010

(65) Prior Publication Data

US 2010/0319511 A1 Dec. 23, 2010

Related U.S. Application Data

(62) Division of application No. 10/270,849, filed on Oct. 14, 2002, now abandoned.

(51) Int. Cl.

*B27B 5/36* (2006.01)
*B27B 25/00* (2006.01)
*B23D 45/14* (2006.01)

(52) U.S. Cl. ............................ 83/424; 83/471.3; 83/581

(58) Field of Classification Search .............. 83/34, 404, 83/76.6, 76.7, 107, 276, 72, 438, 76.1, 453, 83/471.3, 473, 477, 477.1, 486.1, 581, 471.2, 83/472, 471, 781, 809, 810, 157, 452, 424; 144/363, 377, 379, 378

See application file for complete search history.

(56) References Cited

U.S. PATENT DOCUMENTS 2,550,191 A 4/1951 Godat
2,621,686 A 12/1952 Everette
3,302,659 A 2/1957 Edler
3,289,662 A * 12/1966 Garrison ......................... 125/14
3,482,610 A 12/1969 Botefouhr
3,491,805 A 1/1970 Reidener
3,577,829 A 5/1971 Hurn et al.
3,665,982 A 5/1972 Kvalheim
3,719,113 A 3/1973 Gerber
3,807,261 A 4/1974 Couvreur
3,848,646 A 11/1974 Miles
4,017,976 A 4/1977 Barr
4,195,346 A 3/1980 Schroder
4,277,998 A 7/1981 Mayo
4,316,400 A 2/1982 Mayo
4,410,022 A 10/1983 Peterson
4,452,117 A 6/1984 Brickner et al.
4,461,196 A 7/1984 Schramm, II
4,524,894 A 6/1985 Leblond
4,545,274 A 10/1985 Germond (Continued)

OTHER PUBLICATIONS

Automill RS; Alpine Engineered Products, Inc., Feb. 24, 2003.

(Continued)

*Primary Examiner* — Ghassem Alie

(74) *Attorney, Agent, or Firm* — Peter V. Schroeder; Booth Albanesi Schroeder LLC; John Booth

(57) ABSTRACT

A method for automatically cutting a workpiece by moving a workpiece along its longitudinal axis, positioning a cutting blade by rotating the blade about a vertical axis, positioning the cutting blade by rotating about a bevel axis, and moving the blade into cutting contact with the workpiece, thereby cutting the workpiece at a compound angle. The method may also include positioning the blade along a transverse axis. Further steps may include moving the cutting blade along a transverse axis simultaneous to moving the workpiece along its longitudinal axis, thereby creating a scarf cut; sorting a finished workpiece; and marking the workpiece.

6 Claims, 6 Drawing Sheets

U.S. PATENT DOCUMENTS

| | | | | |
|---|---|---|---|---|
| 4,576,076 | A | 3/1986 | Pyle | |
| 4,676,129 | A * | 6/1987 | Blanco | 83/76.7 |
| 4,794,963 | A | 1/1989 | Oppeneer | |
| 4,920,495 | A | 4/1990 | Pilkington | |
| 4,958,544 | A | 9/1990 | Miyamoto | |
| 5,086,678 | A | 2/1992 | Aoyagi | |
| 5,176,060 | A | 1/1993 | Thornton | |
| 5,297,463 | A | 3/1994 | O'Banion | |
| 5,440,977 | A | 8/1995 | Poutanen | |
| 5,444,635 | A | 8/1995 | Blaine | |
| 5,568,756 | A | 10/1996 | Peterson | |
| 5,813,806 | A | 9/1998 | Muller | |
| 5,931,073 | A * | 8/1999 | Hoyer-Ellefsen | 83/471.3 |
| 5,943,239 | A | 8/1999 | Shamblin | |
| 6,000,305 | A | 12/1999 | Link | |
| 6,056,682 | A | 5/2000 | Belanger | |
| 6,097,168 | A | 8/2000 | Katoh | |
| 6,212,983 | B1 * | 4/2001 | Pyle | 83/34 |
| 6,260,263 | B1 | 7/2001 | Haase | |
| 6,263,773 | B1 | 7/2001 | McAdoo | |
| 6,272,961 | B1 * | 8/2001 | Lee | 83/581 |
| 6,539,830 | B1 | 4/2003 | Koskovich | |
| 6,615,100 | B1 * | 9/2003 | Urmson | 700/167 |
| 6,899,005 | B1 | 5/2005 | O'Banion | |
| 7,000,658 | B1 | 2/2006 | Soukiassian | |
| 7,331,267 | B2 | 2/2008 | Urmson | |
| 2001/0000856 | A1 | 5/2001 | O'Banion | |
| 2002/0194967 | A1 | 12/2002 | Prust | |
| 2006/0219073 | A1 * | 10/2006 | Urmson | 83/469 |
| 2008/0110311 | A1 | 5/2008 | Stangherlin | |
| 2008/0223188 | A1 | 9/2008 | Snartland | |
| 2009/0241747 | A1 | 10/2009 | Dale | |
| 2009/0266211 | A1 | 10/2009 | Westfall | |
| 2009/0308217 | A1 | 12/2009 | Alvarez | |

OTHER PUBLICATIONS

Hundegger K2 Milling Machine; www.hundeggerusa.com; 2002.
RAM Easy Rider; Alpine Engineered Products, Inc.; Aug. 13, 2001.
The Hundegger Speed-Cut Machine; www.hundeggerusa.com; Aug. 19, 2003.
Brennan; "The TCT WebSaw is the best thing to hit the truss industry in my 27 years", Klaisler Manufacturing Corporation. (admitted prior art).
"TCT Slideshow", TCT Manufacturing, Inc. (admitted prior art).
"TCT", TCT Manufacturing, Inc. (admitted prior art).

* cited by examiner

LINEAR FEED CUTTING APPARATUS AND METHOD

CROSS REFERENCE TO RELATED APPLICATIONS

This application is a divisional of U.S. patent application Ser. No. 10/270,849 entitled "LINEAR FEED CUTTING APPARATUS AND METHOD" filed on Oct. 14, 2002 now abandoned.

FIELD OF THE INVENTION

This invention relates, in general, to an apparatus for the cutting of wood components, namely, dimension lumber into finished rafters having predetermined lengths and angles at the ends thereof, for use in building construction. In particular, this invention relates to an apparatus, including a novel linear feed table and adjustable cutting device, for processing workpieces into finished components for assembly, and to a computer control and program for controlling same.

BACKGROUND OF THE INVENTION

Most lumber used in the construction industry is known as dimension lumber, which the present invention is intended to use. Dimension lumber has opposite sides parallel, with adjacent sides forming a right angle, and is generally known by the nominal dimensions of the sides, e.g., 2×4, 2×6, 4×8, etc. The longer sides hereinafter are called "faces," and the shorter sides are called "edges." The pieces of dimension lumber to be processed by the present invention are called "workpieces" herein and, after cutting or processing, are called "components," e.g., rafters of several kinds, and webs and chords for trusses.

There are three kinds of rafters with which the present invention is primarily concerned:

1. "regular" rafters:
   those which intersect their support or supported members, i.e. plates or ridge beams, respectively, at right angles to the faces, but at an angle to the edges thereof;
2. "jack" rafters:
   those which, at one end, intersect at least one of their support or supported members at something other than a right angle to each of the faces and edges of the rafter, requiring a cut at what is called hereinafter a "compound" angle or a "bevel" cut on that end of the rafter; and
3. "hip" and "valley" rafters:
   those which intersect their support or supported members where two or more come together at an angle, requiring two cuts on that end of the rafter, one or both of which may be compound angles. The angle at which the support or supported members come together is often, but not always, a right angle.

FIG. 2 illustrates each of these kinds of rafters.

The present invention is also useful in cutting all of the webs and chords for a single truss in one operation. Typically, an individual component for a number of trusses was made up at the same time, to reduce the amount of hand adjustment, and therefore cost, per component. Otherwise, it became very expensive to produce them for a single truss, since adjustments had to be made between the cutting of each different component. Alternately, workpieces were fed into a cutting apparatus laterally, as opposed to linearly, as in the present invention. Lateral feed assemblies allow for simultaneous cutting of the ends of the workpieces, but are not as efficient where the saw blades must reset between each workpiece.

To lay out a roof structure, certain distances must be accurately known:

1. the distance between the outside edges of the double top plate;
2. the vertical distance from the upper face of the top-plate to the ridge line; and
3. the inclined, or slant, distance between the outside edge of the double top plates and the ridge line.

It will help in understanding the following discussion to refer to FIGS. 1A-C of the drawings herein, which disclose three typical arrangements of rafters and their associated support or supported members, and will help to illustrate the concepts of "measuring line" and "ridge line";

1. FIG. 1C discloses a rafter simply laid upon the double top plate and the ridge beam, without cutting the rafter, except perhaps for a small notch at the upper end where it rests on the ridge beam;
   a. the "measuring line" runs along the lower edge of the rafter, and
   b. the "ridge line" is at the bottom of the rafter where it meets the adjoining or complementary rafter.
2. FIG. 1B discloses a rafter notched at both upper and lower ends to fit over the ridge beam and the double top plate, respectively. In this case:
   a. the "measuring line" runs parallel to the rafter's lower edge, from the outer upper edge of the double top plates to the center line of the ridge beam above its upper edge; and
   b. the "ridge line" is at the intersection of the two rafter measuring lines.
3. FIG. 1A discloses a rafter cut at both upper and lower ends to rest against the face of the ridge beam and the upper face of the double top plate, and the lower edge of the rafter intersects the lower edge of the ridge beam and the inner edge of the double top plate. In this case:
   a. the "measuring line" runs parallel to the lower edge of the rafter, from the outer upper edge of the double top plates to the point of intersection of the measuring line with the face of the ridge beam; and
   b. the "ridge line" runs down the midpoint of the ridge beam intersecting the projection of the measuring line.

The first structure of FIG. 1C is an older method of construction little used at the present time.

The second and third structures of FIGS. 1B AND 1A represent methods of construction which are more widely used at present.

Regular rafters, i.e., those on which the ends are cut at right angles to the faces (or the edges), even though the ends may be cut at something other than a right angle to the edges (or the faces, respectively), do not present a great problem to manufacture, since the length of a given rafter as measured on one face (or edge) is the same as the length measured on the other face (or edge).

However, hip, valley, and jack rafters present a more difficult problem of manufacture:

1. since jack rafters have at least one end thereof cut at a compound angle, i.e., an angle both to the edges and to the faces, the lengths of opposite faces (and/or edges) thereof are unequal; and
2. hip and valley rafters have at least one end which requires two cuts, both of which are at angles to the faces and edges, but which are usually at right angles to each other (although not necessarily). Although the lengths on the faces may be equal, the length on the measuring line will be different than both.

Present machinery for making cuts to produce composite or compound angles on roof structure components still requires substantial hand labor in the set-up and/or operation of cutting equipment.

U.S. Pat. No. 4,545,274 teaches a means of tilting the axis of travel of a saw blade to correspond to the complement of the roof slope, and then angling the saw blade to make the compound cut. Lumber is moved past the cutting station in a sideways manner. A separate cutting station is required for cuts on the other end of the component and, to cut components of differing lengths, one of the cutting stations must be movable in relation to the other, which takes time. Further, the cutting process is not automatic.

U.S. Pat. No. 6,212,983 incorporated herein by reference, teaches a linear feed system where compound cuts are achieved by tilting the work surface supporting the workpiece. This requires automating and adjusting the work surface to be movable for compound cuts. Adjusting workpieces of great length may prove cumbersome. An example of a lateral feed assembly can be found in Shamblin, U.S. Pat. No. 5,943,239, which is incorporated herein. Such a system employs four or more cutters and requires more work space and added expense.

There is no known linear feed machinery presently available to sequentially and automatically make the cuts necessary to achieve compound angles.

DETAILED DESCRIPTION OF A PREFERRED EMBODIMENT

The present invention is an apparatus for making roof structure and other components from dimension lumber workpieces by making the required cuts in a sequential manner. Components such as hip, valley, and jack rafters, and webs and chords for trusses, are easily obtained.

As stated earlier, hereinafter "workpiece" refers to the unprocessed, or partially processed pieces of dimension lumber, while "component" refers only to the finished piece, after all processing has been performed.

Figure 1C:
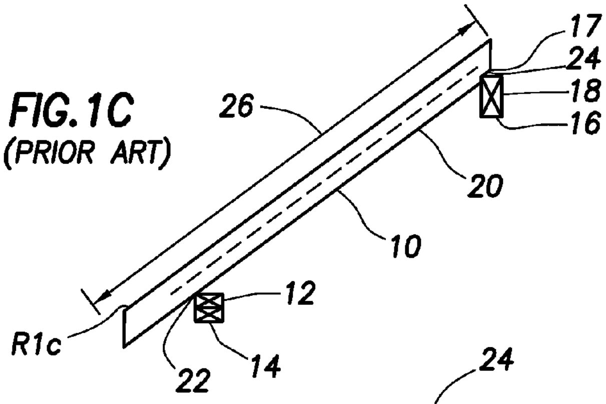
FIG. 1C (PRIOR ART)
FIGS. 1A-C are profile views of regular rafters as used in three typical installings, disclosing the parameters which establish the measuring and cutting points for the operation of the present invention.
Figure 1B:
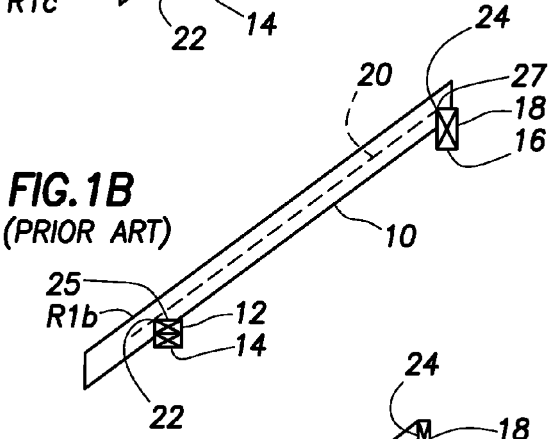
FIG. 1B (PRIOR ART)
Figure 3:
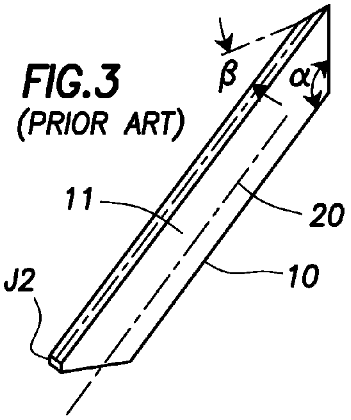
FIG. 3 (PRIOR ART)
FIG. 3 is an oblique view of a jack rafter, with the important lines and angles indicated thereon.
Figure 1A:
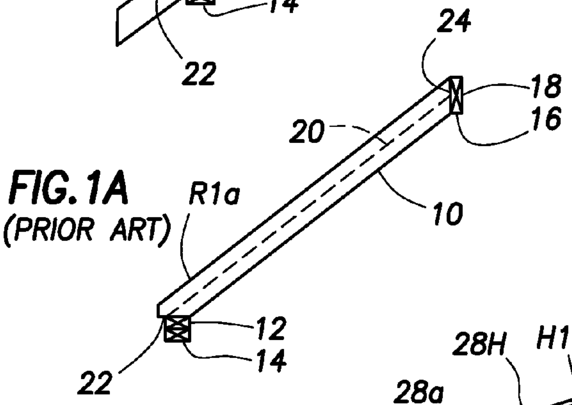
FIG. 1A (PRIOR ART)
Figure 2:
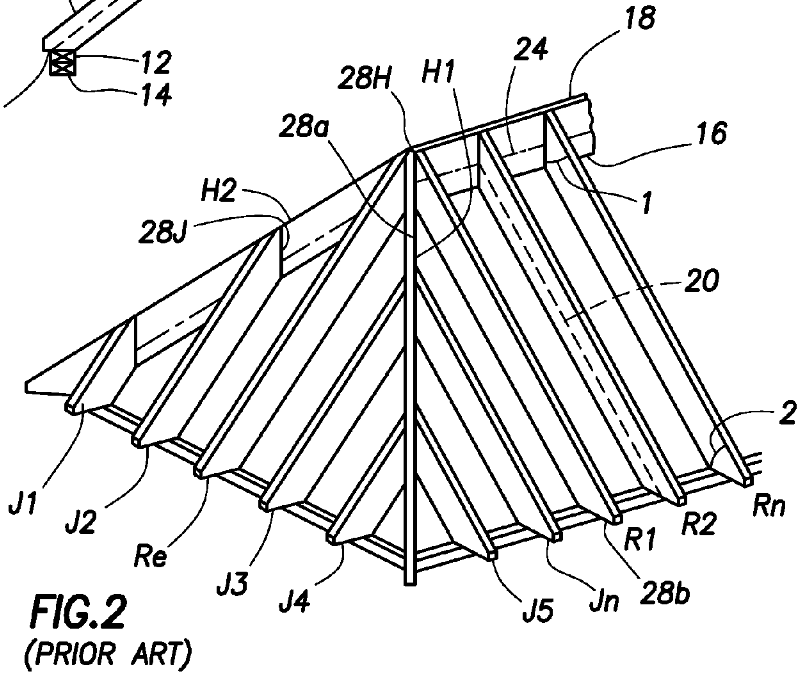
FIG. 2 (PRIOR ART)
FIG. 2 is an oblique view of a hip roof and its components, including rafters, showing the important structural relationships thereof.

It will be helpful to refer to FIGS. 1-3, in understanding the following preliminary description.

Regular rafters, as disclosed in FIGS. 1A-C, and especially as disclosed in place in FIG. 2, although having the ends thereof cut at angles other than a right angle to the rafter edges, have a right angle between the end of the rafter and its faces, requiring only that the cutting tool be at the proper angle to the edges to make the cut.

Hip, valley, and jack rafters require that the cutting tool cut at compound angles, sometimes on the same workpiece and on the same end thereof:

1. jack rafters, as disclosed in place in FIG. 2, and especially in FIG. 3, have at least one end thereof which is cut at an angle to both the edges and the faces, this is a "compound" angle or "bevel" cut;
2. hip rafters, as disclosed in FIG. 2., have at least one end which requires two cuts, both at compound angles to the faces and edges; and valley rafters (not shown in place) have the same form as hip rafters, but are needed where two sloping roofs create a valley, and present the same problems in cutting as a hip rafter.

FIGS. 1A-C show typical regular rafters R1*a*, R1*b*, and R1*c* for convenience, spanning from double top plates 14 to ridge beam 18.

In FIG. 1A, rafter R1*a* rests on double top plates 14 on the outer end, and on ridge beam 18 on the inner end. Lower edge 10 intersects inner edge 12 of double top plate 14 and lower edge 16 of ridge beam 18. "Measuring line" 20 is defined as a line, parallel to lower edge 10, extending across outer edge 22 of plate 14 to its intersection with the face of ridge beam 18. Line 24 on beam 18, which is parallel to lower edge 16 thereof, and passes through the point where measuring line 20 intersects the face of beam 18, is defined as "ridge line" 24 (see FIG. 2 also).

In FIG. 1B, rafter R1*b* rests on plate 14 on its outer end and on ridge beam 18 on its inner end. Ridge line 24 is the center line of edge beam 18. Notch 25 is cut into the lower edge 10 of rafter R1*b* so that lower edge 10 intersects inner edge 12 of double top plate 14. Notch 27 is cut into bottom edge 10 of rafter R1*b* at its upper end so that measuring line 20 intersects ridge line 24.

In FIG. 1C, rafter R1*c* rests on plate 14 on the lower end and on ridge beam 16 on the upper end. Lower edge 10 intersects outer edge 22 of plate 14 and upper edge 17 of beam 18. Measuring line 20 in this configuration is defined as a line extending along lower edge 10 of rafter R1*c*. Ridge line 24 is along the intersection of lower edge 10 of rafter R1*c* and its counterpart (not shown) on the opposite side of ridge beam 18. FIG. 1C represents an older construction method which is seldom used at the present time.

FIG. 2 shows a hip roof structure, with the various structural members identified to help in explaining these critical dimensions and their relation to the novel operation of the present invention.

FIG. 2 shows regular rafters R1, R2 . . . Rn placed with lower edge 10 thereof intersecting inside edge 12 of double top plate 14, which is the top of the frame structures (now shown). Lower edge 10 of rafters R1 . . . Rn intersect lower edge 16 of ridge beam 18, as shown in FIG. 1A. Measuring line 20, in this configuration, runs parallel to edge 10, from outer edge 22 of plates 14, and ridge line 24 is at the midpoint of the two faces of ridge beam 18, parallel to lower edge 16, through the point of intersection of measuring line 20 with the face of beam 18.

Length 26 of these rafters is measured along measuring line 20, and is greater than the distance between outer edge 22 and the face of beam 18. Ends 28*a* and 28*b*, are cut at angles

1 and 2, respectively, to the edges thereof at these points. The thickness of rafters R1 . . . Rn does not enter into calculations length 26 of regular rafters, since ends 28*a* and 28*b* are cut at right angles to the faces thereof.

It will be noticed that rafter Re, on the end of the hip roof, co-linear in a plan view with ridge beam 18, is a "regular" rafter since the ends thereof are cut square with the faces. Of course, if the shape of the underlying structure is something other than "square," rafter Re might not be co-linear with ridge beam 18 but at an angle thereto.

An inspection of hip rafters H1 and H2, and jack rafters J1 . . . Jn in FIG. 2 (and jack rafter J2, as shown in larger scale in FIG. 3) will disclose that at least one end thereof (the upper end) must not only be cut at an angle to the edges of the rafters, but also at an angle to the faces thereof, because they intersect hip rafters H1 and H2 at an angle. When cutting upper ends 28*j* of jack rafters J1 . . . Jn, or ends 28*h* of hip rafters H1 and H2, it is necessary to take rafter thickness into account, since calculating length 26 on one of the faces thereof will cause these rafters to be too short or too long. FIG. 3 is a somewhat larger scale illustration of jack rafter J2.

On rafters having ends with composite angles, measuring line 20 is calculated as being midway between the faces, e.g., 0.75" from each of the faces on rafters having a nominal thickness of 1.5", such as 2×4's, 2×6's, 2×8's, etc. On rafters or beams of different thicknesses, measuring line 20 would be calculated as being located one-half way from each face.

Figures 4, 7:
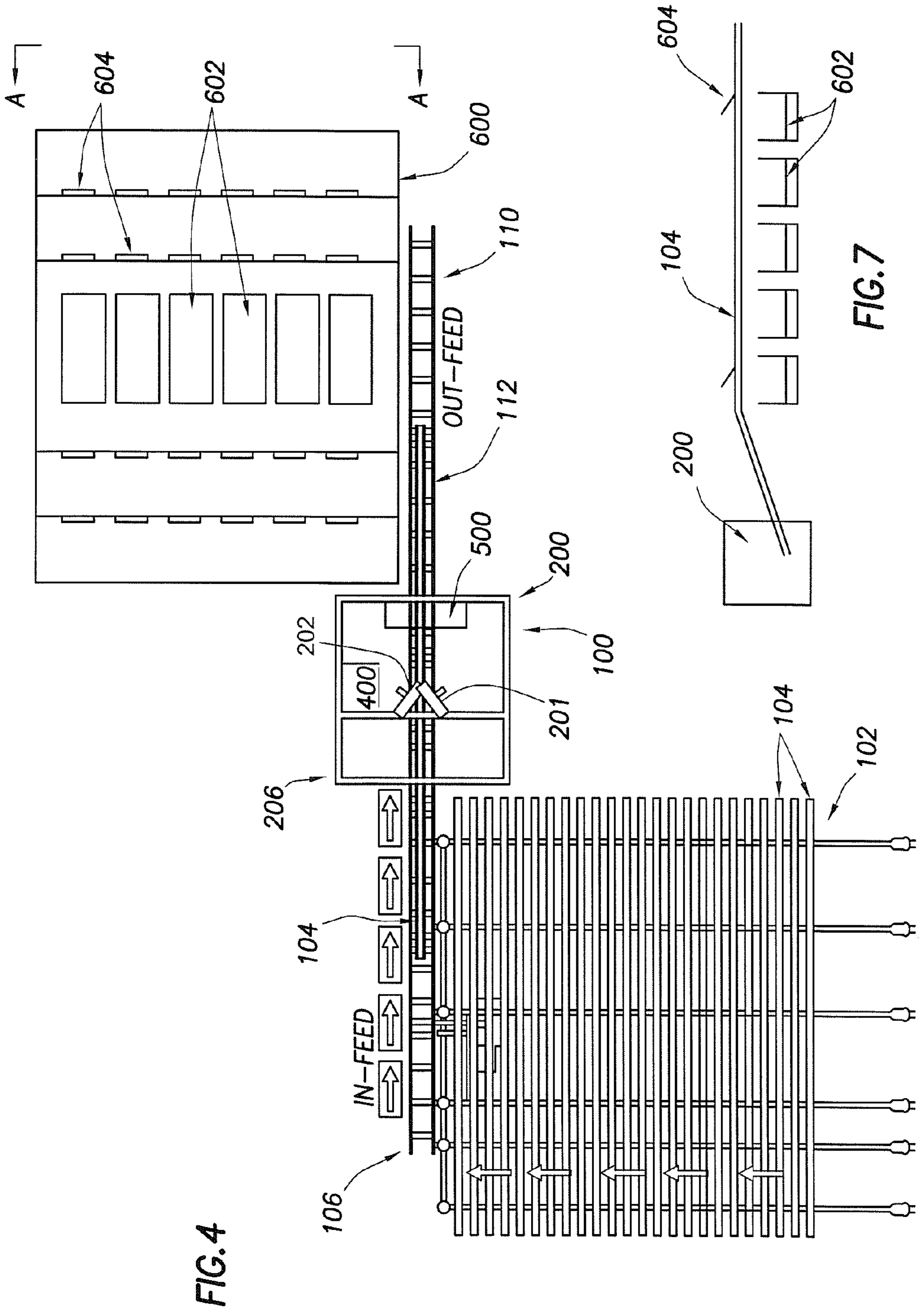
FIG. 4 is a top view of the present invention, disclosing the arrangement of the various major elements thereof.
FIG. 7 is a detail elevational view of a component sorter.

FIG. 4 discloses, in a view from the top, the overall structure of the wood-handling apparatus 100. The wood-handling apparatus 100 preferably includes a live deck 102 for automatically supplying workpieces 104 to the infeed assembly 106. The infeed assembly 106 supplies workpieces 104, one at a time, in a linear feed, to the cutting assembly 200. The out-feed assembly 110 moves finished components 112 away from the cutting assembly 108.

The cutting assembly 200 is shown in more detail in FIGS. 5A-5D. The cutting assembly 200 has at least one cutting blade 202, here shown as a circular saw blade. FIG. 4 shows an optimal arrangement of a cutting assembly 200 with multiple cutting blades 201 and 202.

Cutting element 202 is mounted on saw-frame 204 and is movable in several directions. Element 202 is rotatable about its vertical axis V1, allowing motion of the element 202 as shown by arrow A1. The cutting element 202 is shown in its upright or home position 205 in FIG. 5B. The cutting element 202 also moves vertically, allowing movement as indicated by the arrow Z1. The cutting element 202 is movable transversely, across the workpiece 104, as indicated by arrow T1. The cutting element 202 is finally rotatable about axis horizontal C1, allowing movement as indicated by arrow B1. Movement of the workpiece along path L, indicated by arrows L1 and L2, is controlled by linear feed assembly 300, the infeed feeder 302 and outfeed feeder 304 allowing lumber movement as indicated by arrow LM.

The practitioner will realize that the combination of movements allowed by the feed assembly 300 and cutting assembly 200 will enable simple and compound cuts to be made to a workpiece. The cutting assembly 300 is in position for a compound cut in FIG. 5A.

Figure 5A:
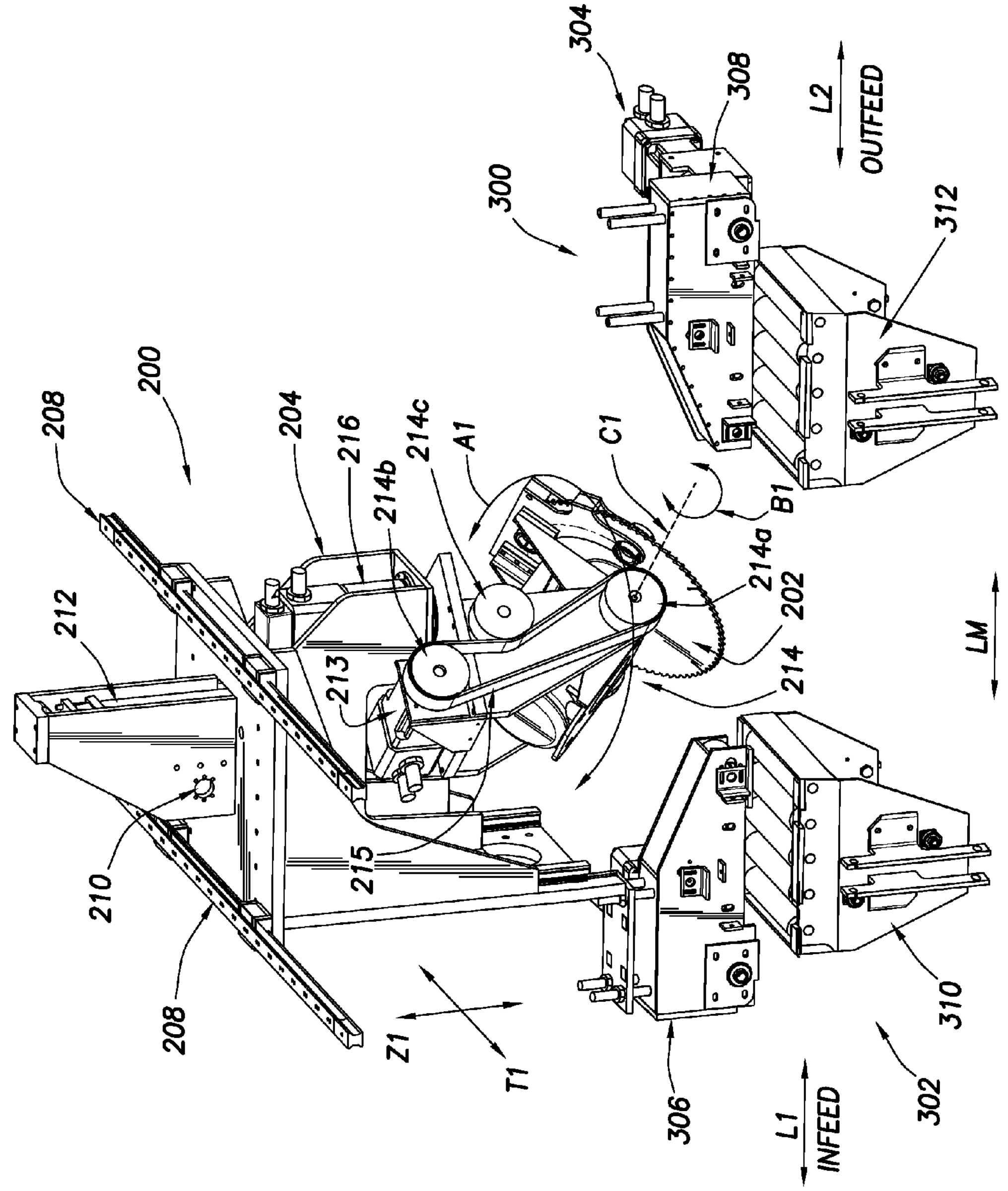
FIG. 5A is an orthogonal view of the cutting assembly in position to make a compound or bevel cut.
Figure 5B:
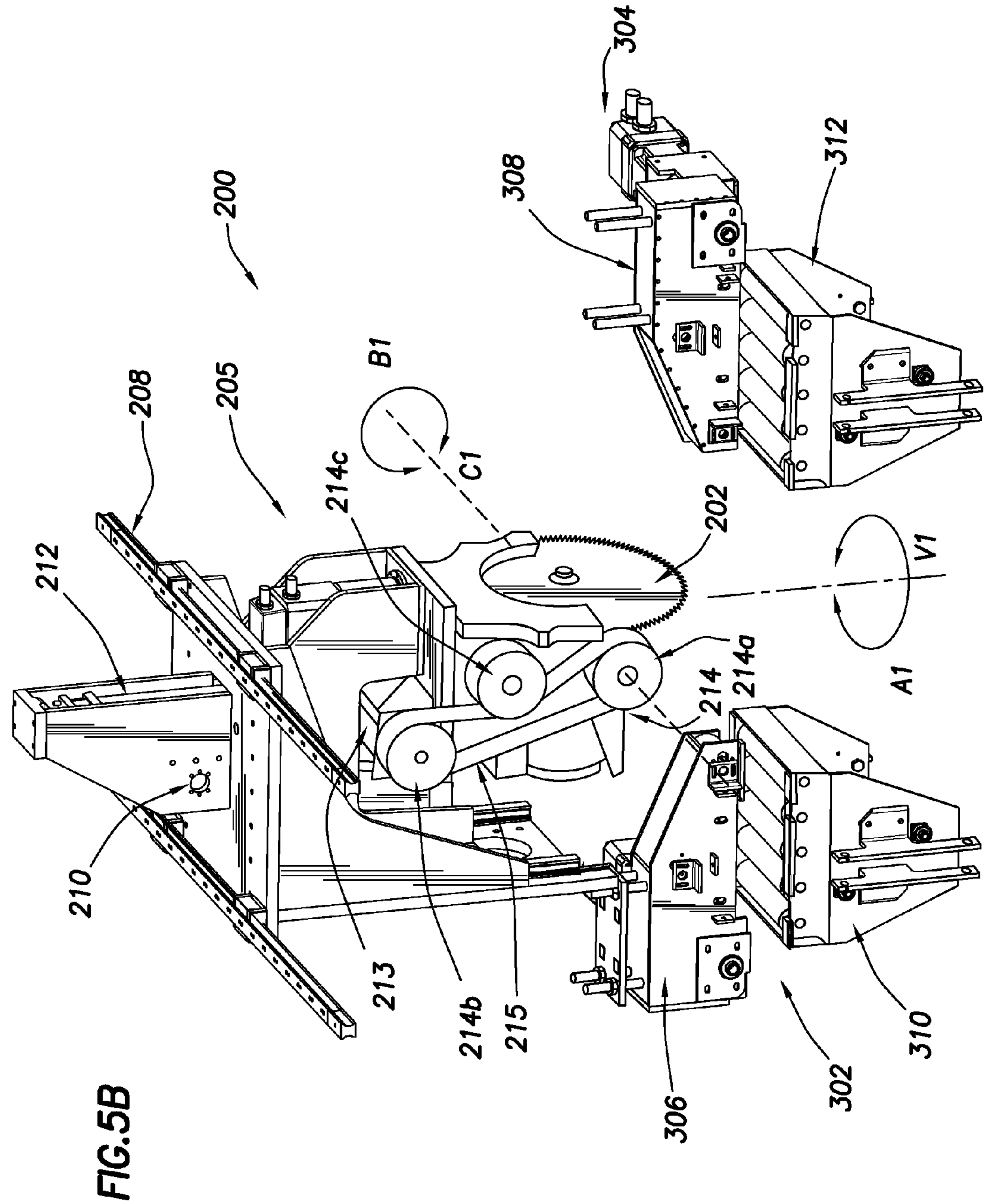
FIG. 5B is an orthogonal view of the cutting assembly in a home position.
Figure 5D:
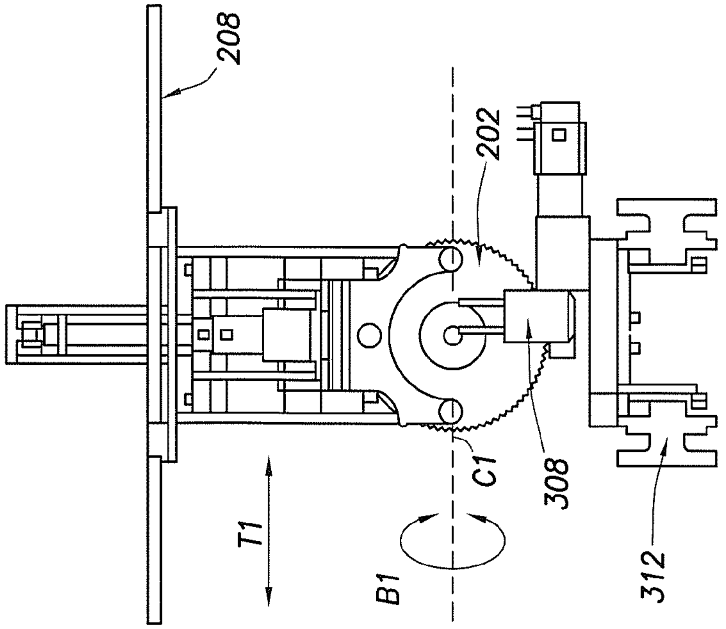
FIG. 5D is a right elevational view of the cutting assembly.
Figure 5C:
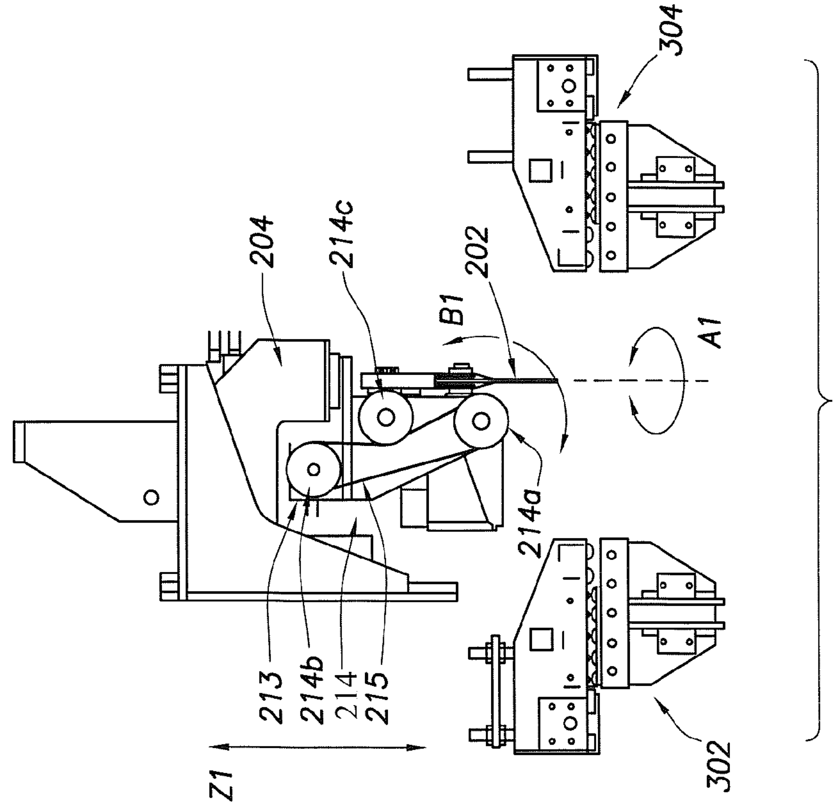
FIG. 5C is a front view of the cutting assembly.

The specific arrangement of the elements of the cutting assembly 200 is not important as long as each of the relative motions of the cutting element 202 is achieved. In a preferred embodiment, the saw frame 204 is mounted to a stable object, such as a saw enclosure 206. In this case, the frame 204 is slidably mounted to transverse rails 208. The frame 204 is movable in the transverse direction, along arrow T1, by movement along a ball-screw shaft (not shown) which interacts with aperture 210 in a manner know in the art. Piston-cylinder assembly 212 controls the movement of the cutting element 202 in the vertical plane, as indicated by the arrow Z1. Rotation of the cutting element 202 is controlled by actuator 214, namely servomotor 213 and belt 215 and pulleys 214*a*, 214*b* and 214*c* allowing motion indicated by arrow B1 about horizontal axis C1. Axis C1 is collinear with the axis of pulley 214*a*, as shown in FIGS. 5A-C. Similarly, rotation about the vertical pivot, movement along line A1, is controlled by an actuator 216. Note that in the preferred embodiment, movement in the transverse direction moves actuators 212, 214 and 216 along with all of frame 204. This arrangement can be modified as desired as long as movement is allowed in the desired directions. Further, the preferred embodiment utilizes, convenient actuator mechanisms but any means known in the art may be used to effect the various movements of the cutting elements.

Linear movement of the workpiece is handled by the linear feeder 300, namely the infeed feeder 302 and the outfeed feeder 304. Each feeder 302 and 304 has an upper component, 306 and 308, and a lower component 310 and 312, respectively. In the preferred embodiment, the upper components, 306 and 308, are the drive components. The upper components 306 and 308 are movable in the Z axis allowing the upper components to clamp down on a workpiece to effectuate movement thereof.

Figure 6:
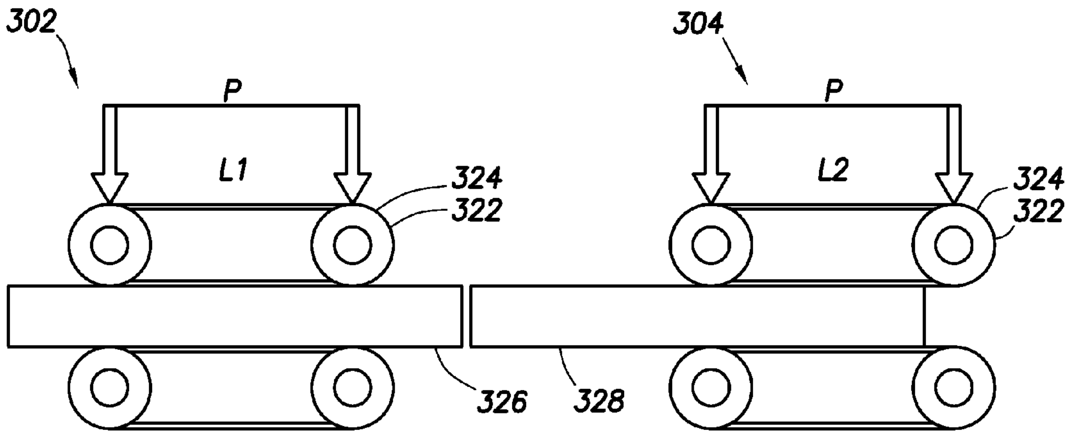
FIG. 6 is a detail schematic elevational view of the feeder assembly.

The linear feeder 300 further comprises sensors (not shown) for sensing the presence of a workpiece and locating the end thereof. Use of such sensors is known in the art. The upper components 306 and 308, seen in detail FIG. 6, have belts that press against the lumber and grip it against the lower components 310 and 312. The drive mechanism for the belt is a servomotor with a measuring device or encoder, that measures the length of the workpiece as it feeds the lumber. Other drive mechanisms 324 and encoders 322 may be used, as are known in the art. The two units 302 and 304 are capable of working together, moving a single workpiece at the same rate, or independently. Independent functionality is necessary since a workpiece may be cut and the upstream piece 326 need to be moved back out of the way to allow movement of downstream piece 328 for further cutting. The finished segment 328 can then be moved downstream to the out feed table 112. The feeder units 302 and 304 act to maintain the workpiece stable during cutting.

Preferably any workpiece that extends at least half-way through either feeder will be held steady enough to cut Pressure can be supplied by springs, hydraulics or other known methods. The feed rolls shown are believed to provide better length measuring accuracy because they are not subject to errors introduced by warped lumber or surface imperfections. Other roller, drive and measuring means may be used, such as that described in U.S. Pat. No. 6,263, 773 to McAdoo which is hereby incorporated for all purposes.

All of the motions of the saw elements and rollers are accurately controlled by computer 400. The computer 400 determines the manner in which to position the saw blade, actuates all motion of the blade elements and rollers, tracks the presence and length of workpieces, and operates to cut workpieces to the required length and shape.

The cutting assembly and roller feed assemblies are operably connected to the computer 400 through appropriate electronics as are known in the art. The computer enables the user to input the desired lengths of wood product needed for a particular job. The computer may optimize the cuts made in the wood product through an appropriate program. Further, the computer controls the cutting unit and the driving unit. The computer receives input signals from at least the position sensors and encoders. The computer is operably connected to activate and control the driver assembly and pressure assembly for positioning the workpieces and the cutting unit. The computer receives input from the measuring assembly to determine the length of the workpiece and to determine the appropriate positioning of the workpiece in selecting the locations of the cuts to be made. The computer may optimize the cuts in the product by a method such as the one disclosed in U.S. Pat. No. 5,444,635 to Blaine, which is incorporated herein by references.

It is possible to add a second cutting assembly 201 to increase productivity. The second cutting assembly 201 is similar to the first, 200, but preferably below-mounted such that the cutting blade moves upward to execute a cut. The second cutting assembly 201 can be used to execute a cut which the first assembly 200 is positioning itself.

The invention can also be combined with a marking assembly 500 as in known in the art, which can mark workpieces as to their size, shape, dimensions, or any other preferred indication.

The out feed system 110 can include a sorter, as seen in FIGS. 4 and 7, as is known in the art, to dump the cut components into carts or other handling mechanisms. The use of sorters 600 and carts 602, with flip-up arms 604 to direct components is well-known in the art and sorters are commercially available from Alpine Engineered Products, Inc.

Figure 8:
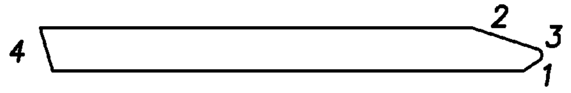
FIG. 8 is a sample workpiece.

In use, the cutting assembly can cut all types of components, including those with compound or bevel cuts. For all cut sequences, a sensor will detect the presence of a board and activate L1 to start the board into the saw. A second sensor will detect the leading edge of the board with sufficient precision to move the board into position for first cut. All subsequent cuts will be under the precise control of the motion control system, so no other adjustments will be needed until a new board is fed into the machine. The motion control system will track and adjust for kerf material removed and end configuration resulting from previous cuts. As an example, FIG. 8 shows a component requiring multiple cuts. With a single-head saw 200, the blade would set up, execute cut 1, reposition and execute cut 2, etc., for all four cuts. If a first 200 and a second 201 cutting unit are employed, unit 200 would position and execute cut 1. Unit 201 would be positioning itself for cut 2 while cut 1 is being made. Unit 201 would then execute cut 2 while unit 200 positioned for cut 3, etc. Prior to cut 4, obviously, the linear feeders would forward and position the workpiece for the final cut. An infinite variety of cuts is possible.

Figure 9:
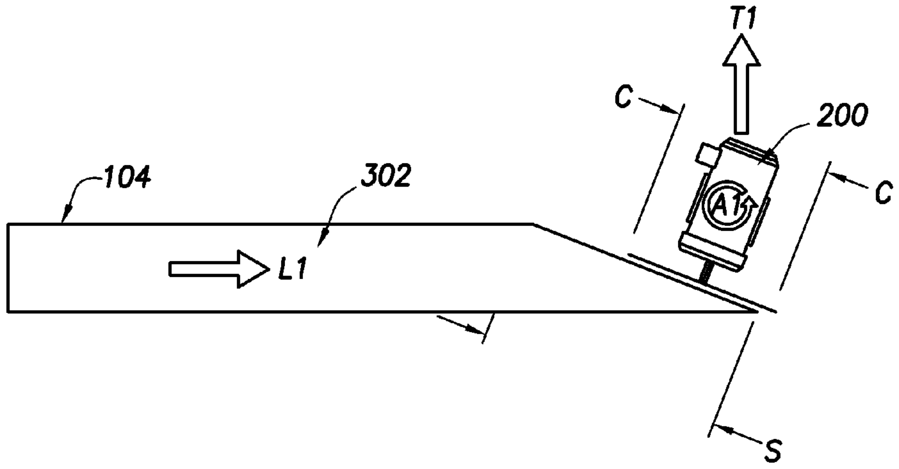
FIG. 9 is a schematic showing operation of the cutting assembly to create a scarf cut.

One type of cut which the prior art machines cannot handle is long scarf cuts. FIG. 9 shows a detail of cutting for scarf cuts. In a scarf cut, the cut length, S, required is greater than the maximum cut C of blade 202. For most cuts, cut length S will be less than maximum cut C. In a scarf cut, however, use of automated movement along axis T1 is employed to make a cut as needed. The workpiece 104 is shown in place, engaged by feed roller assembly 302. The computer 400 positions the cutting blade 202 at the appropriate angle about axis V1, and along other axes as necessary. The cutting blade 202 is lowered, along vertical axis Z1, into cutting contact with the workpiece 104, engaging the workpiece to the maximum cut length C. The workpiece 104, via feed roller 302, is then moved linearly while simultaneously the cutting blade 202 is moved along the T1 axis, thereby translating the blade to mark scarf cut S. This type of cut is not possible without automated movement in the T1 axis.

Practitioners will also note that automated movement along the T1 axis allows the assembly to be used with varying widths of workpieces, e.g., 2, 4, 8 inches, without manual set up of the assembly or any accompanying downtime. This is another improvement offered by the present invention.

While the preferred embodiment of the invention has been disclosed with reference to particular cutting enhancements, and methods of operation thereof, it is to be understood that many changes in detail may be made as a matter of engineering choice without departing from the spirit and scope of the invention as defined by the appended claims.

The invention claimed is:

1. An apparatus for cutting a workpiece, the workpiece having opposed edges and opposed faces, the apparatus comprising:

a linear feed assembly for moving a workpiece along a longitudinal axis of the workpiece, the linear feed assembly having an upstream linear feeder and a downstream linear feeder, the upstream and downstream linear feeders each capable of moving the workpiece upstream and downstream; and a cutting assembly having a cutting blade, the cutting blade having a maximum cut length;

wherein the cutting blade is automatically pivotable about a vertical axis by a first actuator controlled by a computer;

wherein the cutting blade is automatically movable along a transverse axis by a second actuator controlled by the computer;

wherein the cutting blade is automatically rotatable about a horizontal bevel axis by a third actuator controlled by the computer;

wherein the apparatus is capable of automatically creating a scarf cut at an angle of other than 90 degrees with respect to the edges of the workpiece and extending from one opposed edge of the workpiece to the other opposed edge of the workpiece, and wherein the scarf cut has a length greater than the maximum cut length of the blade, the cutting assembly operable to make the scarf cut by simultaneously automatically moving the cutting blade transversely across the workpiece and automatically moving the workpiece longitudinally using the linear feed assembly;

wherein the apparatus is operable to automatically create a bevel cut on a workpiece, the bevel cut being at other than a 90 degree angle to the opposed faces of the workpiece, by rotating the blade about the bevel axis and then moving the blade to make the bevel cut; and wherein the apparatus is operable to create a compound angle cut on the workpiece, the compound angle at other than a 90 degree angle to both the faces and edges of the workpiece, by simultaneously automatically moving the cutting blade and automatically moving the workpiece longitudinally using the linear feed assembly.

2. An apparatus as in claim 1 wherein the second actuator includes a ball screw shaft cooperating with a threaded aperture.

3. An apparatus as in claim 1, wherein the scarf cut is capable of being made by simultaneously moving the workpiece upstream using the linear feed assembly and moving the cutting assembly transversely.

4. An apparatus as in claim 1, wherein the apparatus is capable of creating a compound angle scarf cut, the compound angle being at other than a 90 degree angle to both the edges and faces of the workpiece, and the scarf cut being of greater length than the cut length of the blade and extending between opposed edges of the workpiece.

5. An apparatus as in claim 1, wherein the apparatus is capable of making the scarf cut by first lowering the cutting blade vertically into contact with the workpiece and then moving the cutting blade transversely while simultaneously moving the workpiece longitudinally.

6. An apparatus as in claim 1, wherein the apparatus is operable to cut a workpiece into two pieces, an upstream piece and a downstream piece, and wherein the linear feed assembly is capable of automatically moving the upstream piece away from the downstream piece to allow further cutting of the downstream piece.

* * * * *